United States Patent
Agnew

(10) Patent No.: US 6,847,383 B2
(45) Date of Patent: Jan. 25, 2005

(54) SYSTEM AND METHOD FOR ACCURATELY DISPLAYING SUPERIMPOSED IMAGES

(75) Inventor: Mark S. Agnew, Westport, CT (US)

(73) Assignee: Newag Digital, LLC, Westport, CT (US)

( * ) Notice: Subject to any disclaimer, the term of this patent is extended or adjusted under 35 U.S.C. 154(b) by 0 days.

(21) Appl. No.: 10/289,434

(22) Filed: Nov. 6, 2002

(65) Prior Publication Data

US 2003/0063105 A1 Apr. 3, 2003

Related U.S. Application Data

(62) Division of application No. 09/436,604, filed on Nov. 9, 1999.

(51) Int. Cl.⁷ .............................. A61B 3/10; G09G 5/00
(52) U.S. Cl. ..................... 345/660; 345/619; 345/629; 345/630; 345/624; 345/798; 345/800; 351/204
(58) Field of Search ................................ 345/629–632, 345/633–634, 642, 646, 619, 660, 650, 652, 655, 661, 663, 666, 671, 620–624, 676, 472, 472.1, 472.2, 473, 716, 723, 722, 764, 765, 798, 800, 801, 815, 643; 351/204, 205, 227, 177, 178

(56) References Cited

U.S. PATENT DOCUMENTS

| | | | | |
|---|---|---|---|---|
| 4,845,641 A | * | 7/1989 | Ninomiya et al. | 345/632 |
| 4,852,184 A | * | 7/1989 | Tamura et al. | 382/282 |
| 5,280,570 A | * | 1/1994 | Jordan | 345/632 |
| 5,491,510 A | * | 2/1996 | Gove | 348/77 |
| 5,576,778 A | * | 11/1996 | Fujie et al. | 351/177 |
| 6,095,650 A | * | 8/2000 | Gao et al. | 351/227 |
| 6,231,188 B1 | * | 5/2001 | Gao et al. | 351/227 |
| 6,508,553 B2 | * | 1/2003 | Gao et al. | 351/227 |
| 6,533,418 B1 | * | 3/2003 | Izumitani et al. | 351/204 |
| 6,535,223 B1 | * | 3/2003 | Foley | 345/629 |
| 6,736,506 B2 | * | 5/2004 | Izumitani et al. | 351/204 |

* cited by examiner

Primary Examiner—Kee M. Tung
Assistant Examiner—Wesner Sajous
(74) Attorney, Agent, or Firm—Pillsbury Winthrop LLP

(57) ABSTRACT

The present invention discloses a system and method for accurately displaying superimposed images on a display screen of a computer. The method includes storing a base image having a first feature and a second feature in a storage device of a computer. Data is received which is indicative of a full-scale dimension between the first feature and the second feature. The base image is scaled to have a predefined dimension between the first feature and the second feature when displayed. An accessory image is scaled based upon at least a ratio between the predefined dimension and the full-scale dimension. The scaled accessory image is superimposed onto the scaled base image and displayed to a system user.

27 Claims, 11 Drawing Sheets

SYSTEM AND METHOD FOR ACCURATELY DISPLAYING SUPERIMPOSED IMAGES

This application is a division of Ser. No. 09/436,604 filed Nov. 9, 1999.

BACKGROUND OF THE INVENTION

1. Field of the Invention

The present invention relates generally to a system and method for accurately displaying superimposed images, and, more particularly, to a system and method for scaling an image of a first object, accurately scaling an image of a second object with respect to the scaled image of the first object, and superimposing the two images for display.

2. Background of the Related Art

There are several steps a consumer must typically take in order to purchase an eyewear frame that appeals to him. One significantly time consuming step includes traveling to and from local retailers of eyewear frames to try on the various eyewear frames styles that are available on the market. The main factor motivating the consumer to travel to the retailers is his desire to see himself wearing the eyewear frame that he is considering to purchase. The advantage to the consumer is he can ensure the eyewear frames meet with his personal tastes.

The process of purchasing eyewear frames has becoming even more difficult over the past several years due the dramatic increase in the volume of competitive products. Nowadays, a consumer must consider product attributes such as the eyewear frame size, shape, color, material, and lens tint.

When a consumer visits a retailer to try on eyewear frames, he typically tries the eyewear frames on in front of a mirror. There are disadvantages associated with this method of selecting eyewear frames. For example, it is often difficult for a farsighted consumer to see himself clearly since he must look through eyewear frames that do not include his prescription lenses.

In addition, frames that are of interest to a consumer are oftentimes unavailable since retailers usually maintain only a limited number of eyewear frame styles in inventory. Further, consumers cannot easily view themselves wearing different eyewear frames when dressed in different clothing or wearing a different hair style. Also, the process of trying on tens, or even hundreds of eyewear frames takes a substantial amount of time. Of course, the above problems are exacerbated when the consumer must travel to several retailers to try on eyewear frames.

With the advent of computer-based image generation devices, automated systems have been proposed. Generally, the systems enable a consumer to create a digital image of himself and use computer graphics to superimpose an image of an eyewear frame on the image of the consumer to simulate the consumer wearing the eyewear frame. An example of such an automated system is described in U.S. Pat. No. 4,845,641 to Ninomiya et al. ("Ninomiya"), the contents of which are incorporated herein.

In Ninomiya, a method is disclosed wherein an image of a consumer who is not wearing eyewear frames is obtained using a video camera and is displayed as a still image on a display apparatus. The coordinates of the cornea of the consumer's left eye and right eye are input into the computer using an input means such as a touch panel of a resistive film type that is fixed to the display apparatus. The inter-pupillary distance ("IPD") of the consumer is measured and also input into the computer using a keyboard.

Based on the inputted information, the method calculates a magnification ratio ($m_1$) for the image of the consumer on the display apparatus, an angle of inclination ($\theta$) for a line connecting the corneas of the consumer's left and right eyes, a middle point of the line connecting the corneas of the consumer's left and right eyes, and a magnification ratio (m) for an eyewear frame selected by the consumer. Thereafter, the image of the selected eyewear is scaled using the magnification ratio (m) and superimposed onto the image of the consumer in a position determined by the calculated angle of inclination ($\theta$) and the middle point.

Although the method described by Ninomiya automates the process of trying on eyewear frames to a certain degree, the method includes a number of deficiencies that make it cumbersome to operate and leads to the introduction of errors. For example, the method requires a consumer to input the coordinates of the cornea of the consumer's left and right eyes using an input means (e.g., touch screen). In addition, the method requires the consumer to provide his IPD. Furthermore, the method centers the selected eyewear on the midpoint between the consumer's left and right eyes.

Another attempt to provide an automated system to enable a consumer to try on eyewear is found at the web site www.sterlingoptical.com (Sterling Vision, Inc., East Meadow, N.Y.), the contents of which are incorporated by reference herein. Sterlingoptical.com includes a web page entitled "Virtual Mirror", wherein a consumer may upload a file containing his own image (in .jpg or .jpeg format) and overlay eyewear frames thereon. The image is preferably a frontal view of the consumer. The eyewear frames are selected from a limited collection of eyewear frames provided in the web page.

The web page includes a working area wherein an uploaded image is inserted. The work area includes positioning markers which are utilized by the consumer as a guide for locating and scaling the image. The positioning markers include two circles lying horizontally in line with each other and a semi-circle having its open side facing downwardly and positioned equi-distant between the two circles. A set of controls are provided in the working area for the consumer to move and scale the image as dictated by the positioning markers.

After the consumer's image is properly positioned over the positioning markers in the working area, he is instructed to select a shape which best matches the shape of the his face. The eyewear frames that complement the shape of the his face are highlighted. Upon selecting an eyewear frame, the eyewear frame is aligned with the positioning markers over the image of the consumer's face. Because eyewear frames will always be overlaid in the exact same position with respect to the positioning markers, the frames will be offset from the consumer's face if he does not align the image of the face perfectly with the positioning markers.

Although the Virtual Mirror method takes advantage of technological improvements in the art to further automate the process of trying on eyewear frames, the method still includes a number of deficiencies that make it cumbersome to operate. Most significantly, the method requires a consumer to position the image of the consumer's face to align it with the positioning markers by utilizing the move and scale controls. Ultimately, the process is awkward and the eyewear frames never appear properly positioned on the image of the consumer's face.

The above described methods for automating the process of remotely trying on eyewear frames via a computerized system fall short of providing an efficient and easy to use system. For example, none of the systems suggest a method for automatically scaling the eyewear frames to the consumer's face image. Furthermore, none of the automated systems eliminate the need for a consumer to enter information that is necessary for accurately positioning the consumer and/or eyewear frame image elements.

SUMMARY OF THE INVENTION

One aspect of the present invention is directed to a method for accurately displaying superimposed images on a display screen of a computer. The method includes storing a base image having a first feature and a second feature in a storage device of a computer. Data is received which is indicative of a full-scale dimension between the first feature and the second feature.

The base image is scaled to have a predefined dimension between the first feature and the second feature when displayed. An accessory image is also scaled based upon at least a ratio between the predefined dimension and the full-scale dimension. The ratio may be between about 0.3 and 0.45. The scaled accessory image is superimposed onto the scaled base image and displayed to a system user.

The method also includes the step of locating the first feature and the second feature utilizing an image analysis program. In addition, the method includes the step of automatically aligning the scaled accessory image with a third feature in the scaled base image.

Automatic alignment may be carried out by locating the third feature of the base image utilizing the image analysis program. A first offset dimension between the first feature and the third feature and a second offset dimension between the second feature and the third feature is determined. Thereafter, the accessory image is shifted toward the lesser of the first offset dimension and second offset dimension by approximately one-half the difference between the two dimensions.

The base image may be an image of a face. In such case, the data indicative of the full-scale dimension may be selected from at least one of an interpupillary distance, left monocular pupillary distance, and right monocular pupillary distance. Alternatively, data indicative of the full-scale dimension includes an image of the face and a measurement icon.

If the data indicative of the full-scale dimension includes an image of the face and a measurement icon, and image analysis program may be used to determine a relationship between the distance between each pupil of the face and the length of the measurement icon. This relationship is utilized in determining the full-scale dimension between the pupils in the face.

Another aspect of the present invention is directed to a method facilitating the evaluation of images that are to be superimposed. This method involves storing an uploaded image in a storage device of a computer. A base image is then extracted from the uploaded image. A modified base image is also generated, which includes the base image and a generic accessory image. The base image and the modified base image are transmitted to a system user for evaluation.

The method further includes transmitting the uploaded image in image-map form to a system user. Input is received from the system user identifying a region in the uploaded image requiring further analysis. The region is analyzed to determine the presence of the base image utilizing an image analysis program to locate a first feature and a second feature of the base image.

Another aspect of the present invention is directed to a computer system for accurately displaying superimposed images. The system includes a storage device for storing data related to the images and a processor in communication with the storage device. The processor is operative to execute various instructions to accurately display superimposed images as described below.

Data is stored in the storage device identifying a base image and an accessory image. A first feature and a second feature are located in the base image with an image analysis program. Data indicative of a full-scale dimension between the first feature and the second feature is received. The base image is scaled to have a predefined dimension between the first feature and the second feature when displayed. An accessory image is also scaled based upon at least a ratio between the predefined dimension and the full-scale dimension. The scaled accessory image is superimposed onto the scaled base image and displayed for a system user.

Further features of the system and method of the subject invention will become more readily apparent from the following detailed description taken in conjunction with the drawings.

BRIEF DESCRIPTION OF THE DRAWINGS

So that those of ordinary skill in the art to which the subject invention pertains will more readily understand how to make and use the system and method described herein, preferred embodiments of the invention will be described in detail with reference to the drawings, wherein.

DETAILED DESCRIPTION OF THE PREFERRED EMBODIMENTS

Figure 1:
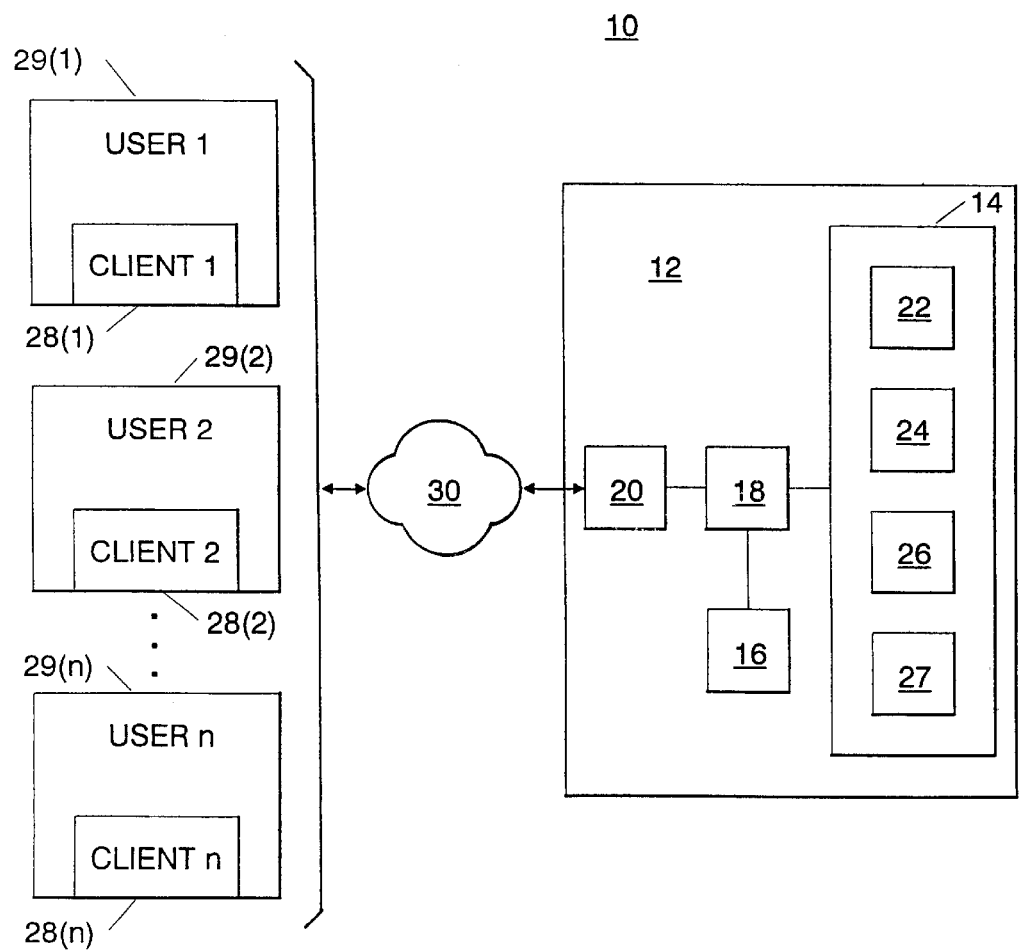
FIG. 1 is a block diagram of a system through which a system user may upload a digital image including one or more face images, extract a particular face image therefrom for manipulating and viewing, and superimpose a selected eyewear frame onto the face image.

Reference is now made to the accompanying Figures for the purpose of describing, in detail, the preferred embodiments of the present invention. The Figures and accompanying detailed description are provided as examples of the invention and are not intended to limit the scope of the claims appended hereto.

It is important to note that although the principles of the present invention are described as they relate to a system and method for accurately displaying an eyewear frame image onto an image of a person's face, those skilled in the art will recognize that the invention has many other applications. In addition, the system and method can be utilized in a number of diverse settings including, for example, doctors' offices, airports, kiosks, and shopping malls. Furthermore, the system and method can be operated as a stand-alone system or over a network.

The present invention provides a novel and unique system and method for enabling a consumer to select and view an eyewear frame from a collection of eyewear frames found in a storage device of a computer. Alternatively, a consumer may conduct a search of the collection of eyewear frames in the storage device and select an eyewear frame for viewing. The search may be based on search terms describing brand names, colors, shapes, materials, and price ranges. The consumer may also upload one or more digital images of his face to a storage device of a computer. An eyewear frame previously selected for viewing may then be superimposed onto the face image that was stored. The superimposed images can then be stored in permanent storage and later recalled for viewing. Several superimposed images can also be displayed simultaneously so that the consumer may make a side-by-side comparison thereof.

For the description that follows, the term "user" or "system user" shall refer to a person that interfaces with the system of the present invention. Typically, system users will directly interface with the system, however, a system user may interface with the system through an intermediary such as, for example, a retailer who directly interfaces with the system as a service. A consumer is an example of a system user. A system user may interface with the present invention through a stand-alone computer system or over a network of computer systems. As an example, a system user may interface with the system over the Internet using a client/server model.

The term "client" shall refer to a computer which includes a processor, storage, display, and an input device. Clients utilize the services of "servers". The term "uploaded image" shall refer to a digital image that is uploaded from, for example, a client to a server. The term "extracted face image" shall refer to a digital image of a person's face which has been extracted, or cropped, from an uploaded image. The term "active face image" shall refer to a particular extracted face image, from among a system user's portfolio of face images, that has been flagged for superimposition. The term "generic frame image" shall refer to a wire-frame model replicating the most basic elements of an eyewear frame. A generic frame image is used for verifying the quality of uploaded images as will be described in more detail below.

Furthermore, the term "inter-pupillary distance" ("IPD"), or "binocular pupillary distance", shall refer to the distance from the center of one pupil to the center of the other pupil. The term "monocular pupillary distance" ("MPD") shall refer to the distance from the center of an individual's pupil to the centerline of the individual's nose as measured along a line connecting both pupils of the individual. Both IPD and MPD are typically measured in millimeters. The term "measurement icon" ("MI") identifies an object having predefined dimensions for use with the present invention in determining the IPD and MPD of an individual. An MI can basically have any shape, however, certain shapes are better suited than others. For example, a circular disk shape will generally be more readily processed by the system of the present invention. A coin may be used as an MI as long as its exact diameter is input into the system. Also, a stamp can be used as an MI as long as its exact length or width are input into the system. The use of an MI with the present invention will be discussed in detail below.

The term "eyewear web site" shall refer to an interactive web site wherein a system user may select, view, and purchase eyewear frames pursuant to a preferred embodiment of the present invention. An eyewear web site includes a web page for selecting and viewing eyewear frames. A web page is also provided for uploading images and extracting face images therefrom. Furthermore, a web page is provided to support the superimposition of selected eyewear frames onto an extracted face image. An example of an eyewear web site having these characteristics is found at www.eyeglasses.com, the contents of which are incorporated by reference herein. Further details describing an eyewear web site as it is used in a preferred embodiment of the present invention are provided below.

Referring now to the drawings wherein like reference numerals identify similar elements, there is illustrated in FIG. 1 a block diagram depicting a computer system 10 for enabling a system user to view and interact with an eyewear web site. System 10 includes a server 12 having an eyewear web site stored in a permanent-type storage device 14. Storage device 14 includes, for example, web-site pages 22, web-site subroutines 24, image/data-base files 26, and image analysis and processing programs 27 that are used to support activities associated with the eyewear web site.

The server 12 is a general purpose network server which includes a computer processing unit 18 ("CPU") for executing application programs stored in the storage device 14. The server 12 also includes a volatile-type storage device 16 for the temporary storage of data. The server 12 further includes a communication port 20 which enables the CPU 18 to communicate with devices external to the server 12.

Linked to the server 12 are one or more clients 28 operated by users 29. As a more specific example, server 12 is linked to client 28(1) which is operated by user 29(1), linked to client 28(2) which is operated by user 29(2), etc. Clients 28(1)-28(n) are linked to the server 12 through a network 30.

Those skilled in the art will appreciate that various types of network 30 schemes are available and include, but are not limited to, connection to the Internet via modems and Internet host, direct Internet connections via routers, hardwired point-to-point connections, radio communications, optical communications, and combinations of the aforementioned. Users may access an eyewear web site provided on server 12 using a browser application such as Netscape Navigator® (Netscape Communications Corp., Mountain View, Calif.) and Microsoft® Internet Explorer (Microsoft Corp., Redmond, Wash.)

Figure 2:
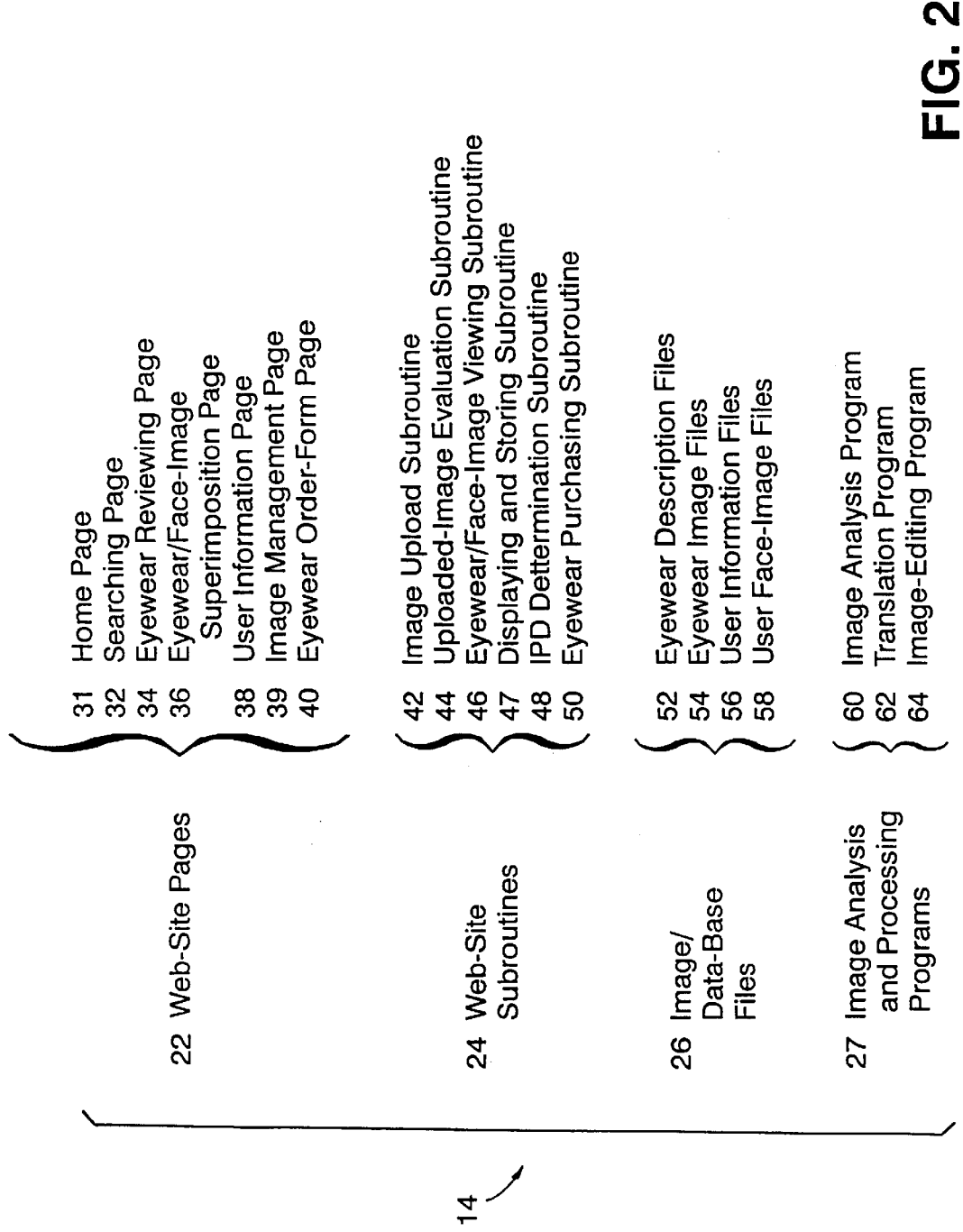
FIG. 2 is a block diagram of components in an embodiment of the storage device illustrated in FIG. 1.

Referring to FIG. 2, a more detailed illustration of storage device 14 is provided which depicts an embodiment of the present invention. The storage device 14 stores several web-site pages 22, typically in html-type format, including a home page 31, searching page 32, eyewear reviewing page 34, eyewear/face-image superimposition page 36, user information page 38, image management page 39, and an eyewear order-form page 40.

In addition, the storage device 14 stores various web-site subroutines 24 including an image upload subroutine 42, uploaded-image evaluation subroutine 44, eyewear/face-image viewing subroutine 46, displaying and storing subroutine 47, IPD determination subroutine 48, and an eyewear purchasing subroutine 50.

Furthermore, the storage device 14 stores several image/data-base files 26 including eyewear description files 52, eyewear image files 54, user information files 56, and user face-image files 58.

Still further, the storage device 14 stores a selection of image analysis and processing programs 27 including image analysis program 60, file translation program 62, and image-editing program 64. The function and purpose of the web-site pages 22, web-site-subroutines 24, image/data-base files 26, and image analysis and processing programs 27 are described in more detail below.

Those skilled in the art will readily appreciate that server 12 may alternatively be configured to store data in an external storage device (not shown) or combinations of internal and internal storage devices. External storage devices may be local or remote to server 12. In addition, the storage devices of the present invention can be of any type known in the art (e.g., floppy disk, hard disk, compact disk, tape drive, etc.)

Although the web-site pages 22, web-site subroutines 24, image/data-base files 26, and image analysis and processing programs 27 are illustrated to be stored in a single storage device 14, those skilled in the art will readily appreciate that the data may be stored in a single device or disparate storage devices. Unless otherwise specified, references herein to a storage device includes permanent and/or volatile storage.

In addition, those skilled in the art will recognize that although the pages, subroutines, files, and programs are particularly described herein, they may assume other forms, arrangements, and/or configurations and still be in keeping with the spirit and scope of the present invention.

Figure 3:
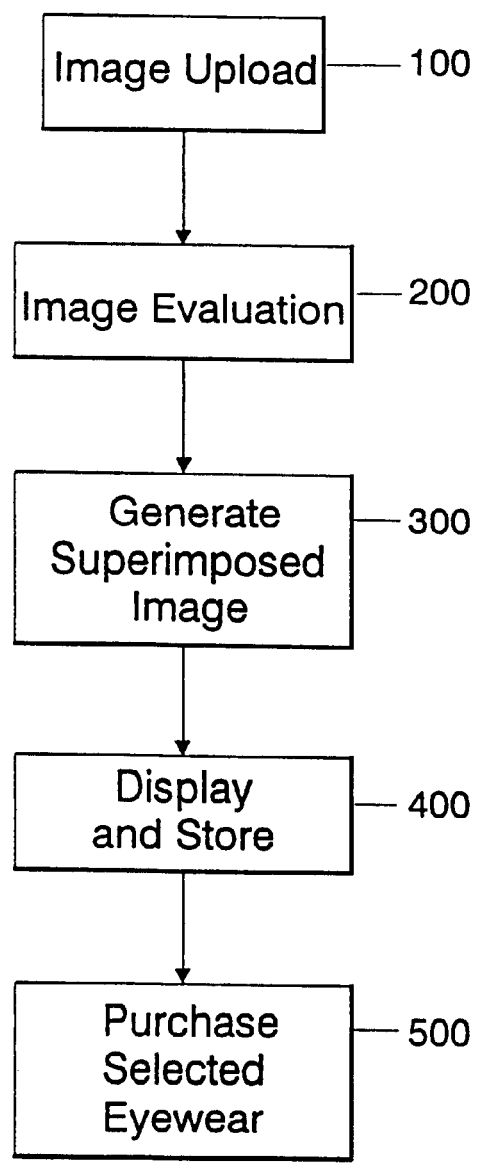
FIG. 3 is a flow chart depicting an overview of an embodiment of the present invention, wherein a system user may upload a digital image including one or more face images, extract a particular face image therefrom, and superimpose a selected eyewear frame onto the face image.

Referring to FIG. 3, a flow chart depicting an overview of an embodiment of the present invention is illustrated. The embodiment enables a system user to upload a digital image including one or more face images, extracts a particular face image therefrom for evaluation and viewing, and superimposes a user-selected eyewear frame onto the extracted face image. The embodiment also facilitates manipulating the position of the eyewear in the superimposed image and purchasing selected eyewear frames.

Initially, at step 100, a system user utilizes subroutine 42 to upload a digital image which includes, for example, an image of the system user's face. The uploaded image is analyzed and a face image is extracted therefrom and stored in the storage device. A copy of the extracted face image is created and modified to include a generic frame image superimposed thereon. The modified face image is also stored in the storage device. Both face images, i.e., the extracted face image and modified face image, are displayed at the client for the system user to evaluate.

At step 200, the system user utilizes subroutine 44 to evaluate the face images. If the face images are found to be defective, the system 12 includes several tools for remediating the defect. The system user stores a satisfactory extracted face image in permanent storage 14. After completing the evaluation, the modified face image is deleted from the storage device.

At step 300, the system user utilizes subroutine 46 to search for and view desired eyewear frames, and to superimpose selected eyewear frames onto an active face image. The image resulting therefrom is referred to as a "superimposed image". To scale the selected eyewear frames, the IPD of the system user is used. If not immediately available, the system user may input the IPD. If the system user does not know the IPD, he may upload an image of himself which includes an MI and process the image utilizing subroutine 48. This process is described in detail below.

At step 400, the system user utilizes subroutine 47 to display and store a selected superimposed image. It is notable that there may be only one active face image at any one time. A system user may select a particular face image in his portfolio of images to be the active face image. However, each newly created face image becomes the active face image by default until another is selected.

At step 500, the system user utilizes subroutine 50 to purchase a selected eyewear frame by identifying the eyewear frame and submitting an electronic order form therefor via secure network transmission methods.

Figure 4:
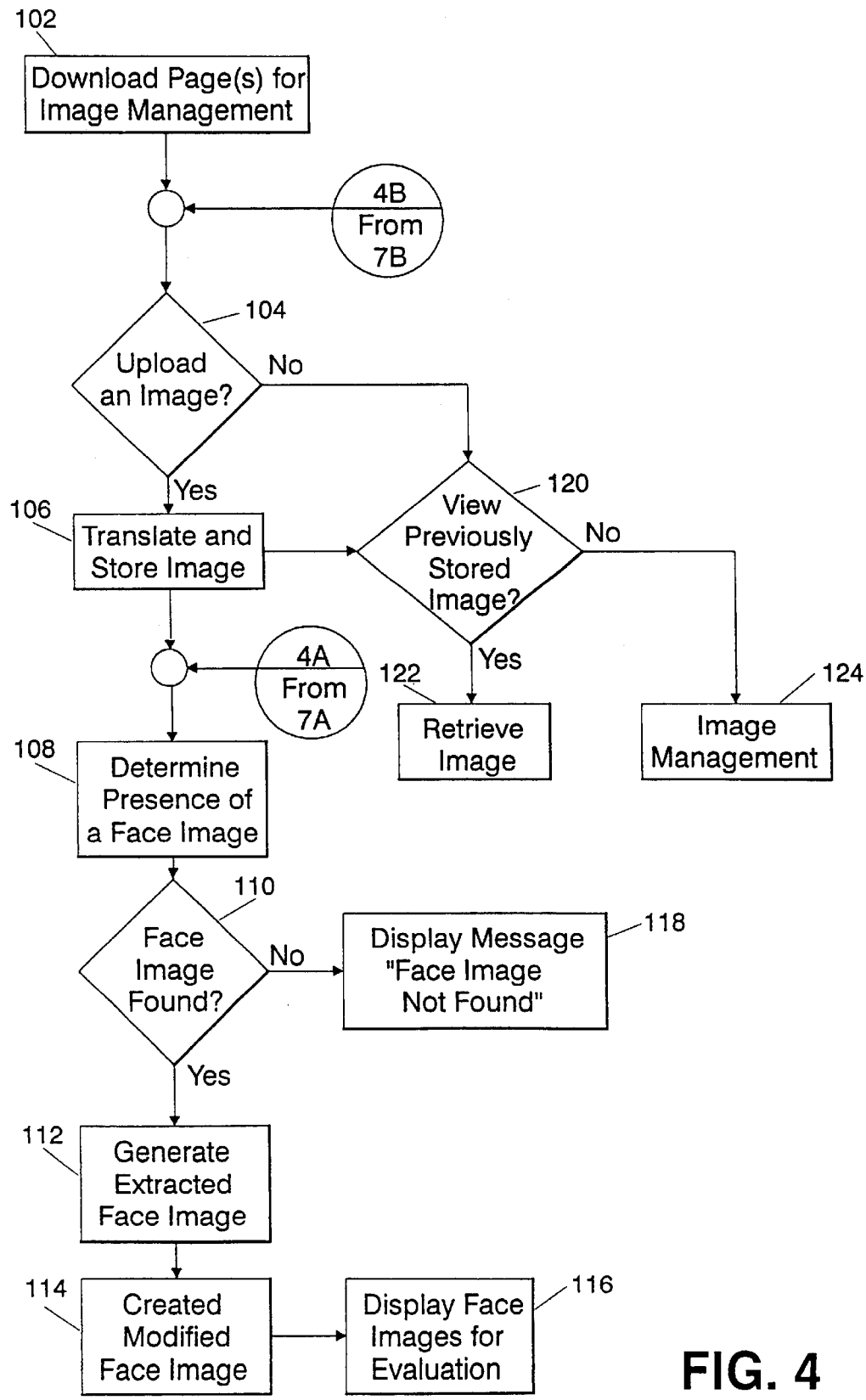
FIG. 4 is a flow chart depicting a process wherein a system user uploads a digital image including one or more face images and the system extracts a particular face image therefrom for viewing.

Referring to FIG. 4, a flow chart illustrates the steps of subroutine 42, wherein a system user uploads a digital image including one or more face images, and a particular face image is extracted therefrom and transmitted to the system user for evaluation. At step 102, the system user downloads the home page 31 of an eyewear web site. After receiving the home page 31, an image management page 39 may be downloaded through a hyperlink. The image management page 39 may link to other web pages to enable the system user to perform various management tasks.

Figure 5:
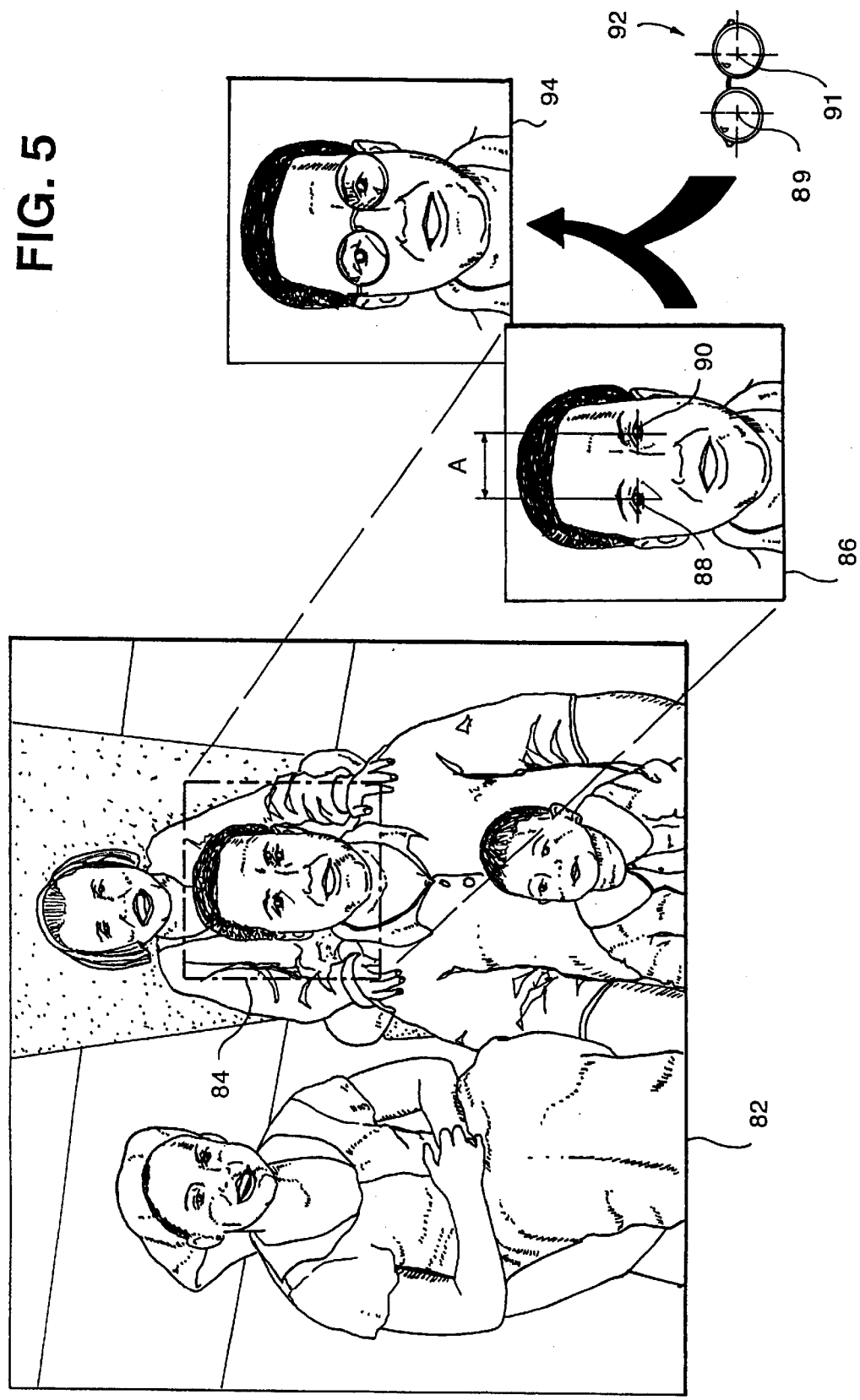
FIG. 5 illustrates the process of extracting a face image from an uploaded image including more than one person.

At step 104, the system user is queried as to whether an image is to be uploaded from the client 28 to the server 12. If an image is to be uploaded, the system user is given the option to directly enter the directory and file name of an image, or browse the directories to select the file name of the image file. The image file may be in any of the well known image formats including, for example, BMP, GIF, JPG, JPEG, PNG, or TIFF. An image including one or more face images may be uploaded. Uploaded image 82 in FIG. 5 is an illustration of an image which includes three individuals. This image may be readily processed by the present invention.

It is notable that although this description only discusses the system user as uploading, evaluating, etc. his own face image for selecting eyewear frames, a system user may also upload, evaluate, etc. face images of others (e.g., his spouse) to select eyewear frames for that person. This is yet another advantage of the present invention.

At step 106, the uploaded image is translated into a format compatible, for example, with the image analysis program 60 and stored in the storage device. Format translations may be carried out utilizing the translation program 62. A translation program useful for this purpose is ImageMagick™ (E. I. du Pont de Nemours and Company, Wilmington, Del.).

At step 108, the uploaded image is analyzed using the image analysis program 60 to determine the presence of one or more faces in the uploaded image. If, at step 110, it is determined that a face image is found, then, at step 112, the image analysis program 60 proceeds to determining the location of each face, the position of each pupil, and the position of the centerline of each nose. As each face image is found, it is prioritized and mapped. The face image having the highest priority is extracted, scaled, and aligned as described below.

The face images are prioritized so that only the image having the highest priority is fully processed, i.e., extracted, scaled, and aligned, thereby reducing unnecessary data processing in the server 12. Prioritization may be based on a measurement of prominent facial features. For example, several face images from an uploaded image may be prioritized based on the relative distance between the pupils found in each face. The face image having the greatest relative distance between the pupils may be assigned the highest priority. This is a logical basis on which to prioritize since the face image having the greatest relative distance between the pupils would more than likely be the largest, and consequently the most detailed image.

Those skilled in the art will appreciate that there are several methods available for evaluating facial features in a digital image. The methods use biometric techniques to convert physical characteristics into patterns or mathematical renderings that can be analyzed by a computer. Examples of these methods include, for example, eigenface, local feature, and neural network analysis. Each method is set forth in detail at www.miros.com, the contents of which are incorporated by reference herein. Image analysis programs that may be integrated into the present invention for performing the image analysis steps include, for example, FaceIt® (Visionics Corp., Jersey City, N.J.), TrueFace (Miros, Inc., Wellesley, Mass.), and PC Iris™ (IriScan, Inc., Marlton, N.J.).

Referring to FIG. 5, as described above, the face image having the highest priority is extracted, scaled, and aligned. For example, a woman's face image 84 in the uploaded image 82 is determined to have the highest priority, e.g., greatest relative distance between the pupils, and, therefor, it is extracted to produce an extracted face image 86. The extracted face image 86 is stored in the storage device.

During the extraction process, the woman's face image 84 is scaled and aligned so that each pupil in the image 84 is coincident with one of two tying points, i.e., points 88 and 90, in extracted face image 86. The distance "A" between the tying points 88 and 90 is such that the extracted face image 86 will be displayed at a scale of between approximately 30%–45% of full scale.

Figure 6A:
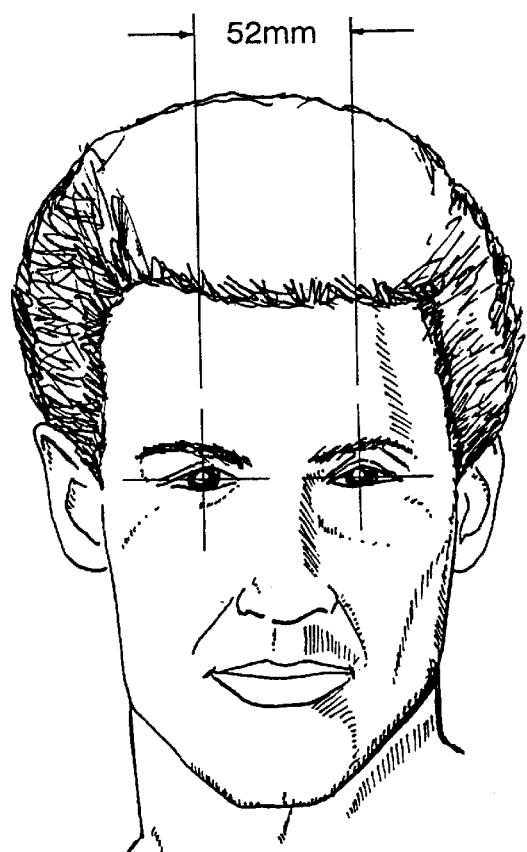
FIGS. 6(a) and 6(b) illustrate a method for determining a display scale.
Figure 6B:
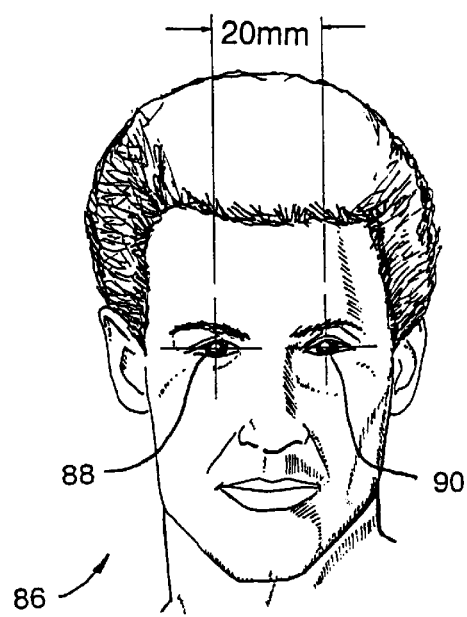

FIGS. 6(*a*) and 6(*b*) illustrate how to determine the display scale of an extracted face image 86. Assuming the IPD of the woman shown in image 84 is 52 mm (FIG. 6(*a*)), and that the tying points 88 and 90 are selected so the pupils are displayed approximately 20 mm apart on a display (FIG. 6(*b*)), then the woman's face will be displayed at a scale of approximately 38.5% of full scale (20 mm/52 mm×100).

Referring again to FIG. 4, at step 114, once an extracted face image 86 is generated, a copy of the image is created and a generic frame image 92 is superimposed thereon, resulting in a modified face image 94. This process is also illustrated in FIG. 5. It should be noted that even though only the frontal view of the generic frame image 92 is described and illustrated herein, it is foreseen that three-dimensional representations may be displayed for superimposition on faces that are angularly positioned in the extracted face image 86.

Generic frame image 92 includes tying points 89 and 91, which are located approximately in line with the focal points in each lens and are separated by a distance equal to the distance separating tying points 88 and 90. The generic frame image 92 is superimposed onto extracted face image 86 to form modified face image 94 such that tying point 89 is coincident with tying point 88, and tying point 91 is coincident with tying point 90. The modified face image 94 is stored in the storage device. At step 116, both the extracted face image 86 and the modified face image 94 are displayed by the client for the system user to evaluate.

If, at step 110, a face image was not found by the image analysis program 60, then, at step 118, a message is displayed to the system user indicating a face image was not found and the possible causes.

If, at step 104, the system user decides not to upload an image, then, at step 120 the system user is queried as to whether he would like to download and view extracted face images that were previously stored by the system user in user face-image files 58. If, at step 120, the system user decides he would like to download and view extracted face images that were previously stored, then, at step 122, one or more extracted face images are selected and downloaded for review.

If, at step 120, the system user decides not to view a previously stored extracted face image, then, at step 124, the system user is given the option to perform a variety of image management tasks including, for example, renaming, deleting, or transmitting image files that were previously stored as user face-image files 58 in the storage device 14.

Figure 7:
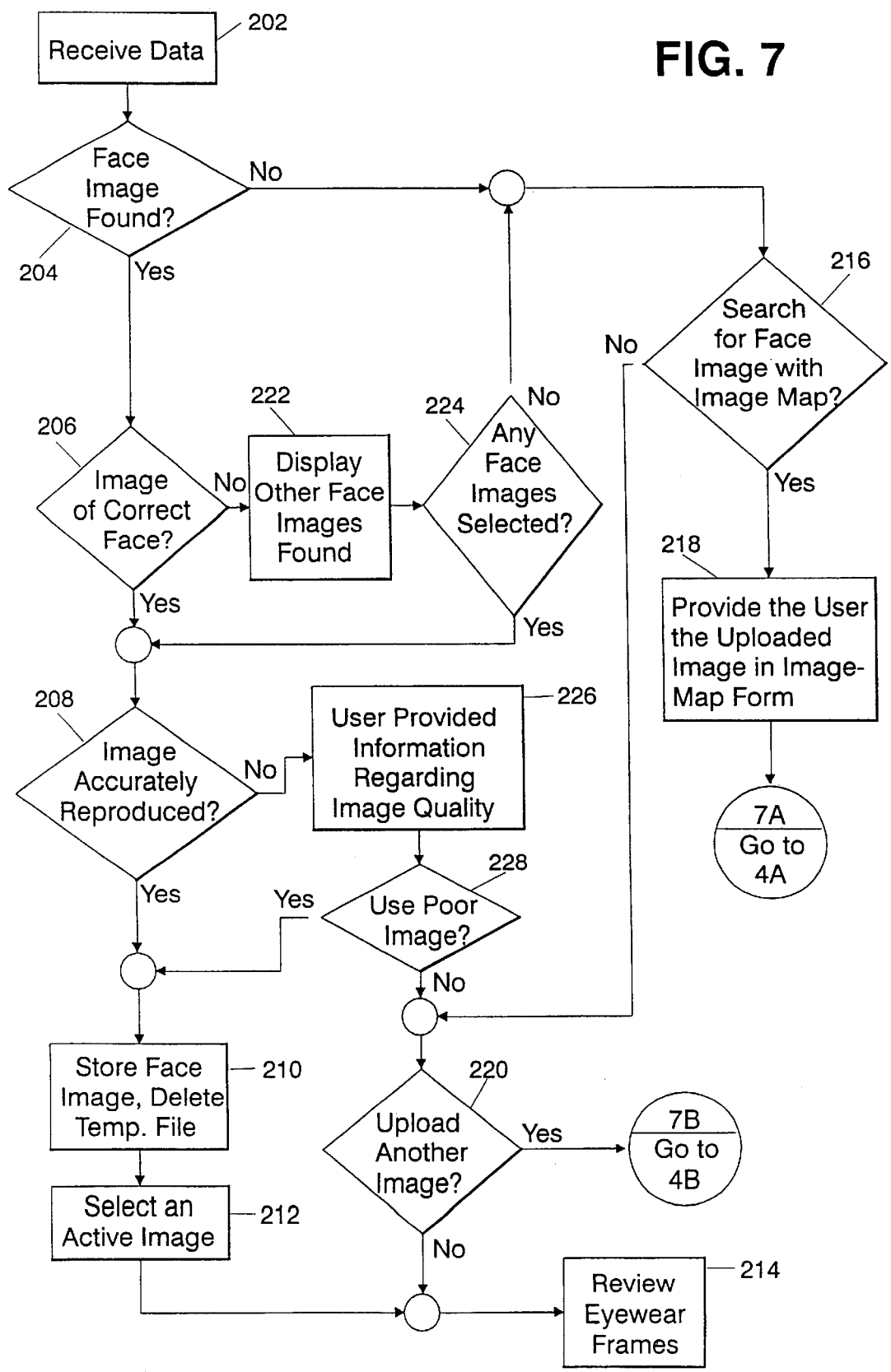
FIG. 7 is a flow chart depicting a process wherein a system user evaluates a face image to determine its acceptability for viewing.

Referring to FIG. 7, a flow chart illustrates the steps of subroutine 44, wherein a system user evaluates an extracted face image to determine its acceptability for superimposition. At step 202, the system user receives either the extracted face image 86 and the modified face image 94, or a message indicating that a face image was not found. If, at step 204, the system user receives face images 86 and 94, then the process proceeds to step 206.

At step 206, the system user is queried as to whether the face images 86 and 94 are of the correct face. If the face images 86 and 94 are of the correct face, the process proceeds to step 208.

At step 208, the system user is queried as to whether the face images 86 and 94 were adequately reproduced. The system user is instructed to consider the images for clarity and the placement of the generic frame image 92 on the woman's face in modified face image 94. If the face images 86 and 94 are adequately reproduced and the generic frame image 92 fits properly on the woman's face in modified face image 94, then, at step 210, the extracted face image 86 is stored as a user face-image file 58 in permanent storage 14. The system user may ultimately upload and store a plurality of face images in permanent storage 14. The plurality of face images stored in permanent storage 14 constitute the system user's portfolio of face images. When an extracted face image 86 is initially stored in user face-image file 58, it becomes the active face image.

At step 212, the system user may select which image in his portfolio of face images is to be the active face image. The active face image will be the particular face image from among the system user's portfolio of face images which is flagged for superimposition with a selected eyewear frame. The process of superimposing a selected eyewear frame is described in more detail below. At step 214, the system user may elect to review eyewear frames.

If, at step 204, the system user receives a message from the server 12 indicating that a face image was not found, then the system user proceeds to step 216. At step 216, the system user is queried as to whether he would desire to repeat the analysis process in one of several selected regions of the uploaded image 82 as defined by the map file generated at step 112 (FIG. 4).

As is well known in the art, images in image-map form include the image embedded in html in such a way that when a system user selects a region in the image, for example, by "clicking" on the region with a mouse, the exact coordinates of that position are identified and pre-programmed commands are executed.

If, at step 216, the system user decides to have the analysis process repeated on a selected region, then, at step 218, the system user is provided the uploaded image 82, in image-map form, so that a region may be selected for further analysis. Of course, the region selected by the system user should include the face image that is of interest. Thereafter, the process proceeds to step 108 (FIG. 4) to determine the presence of a face image and continues as described above.

If, at step 216, the system user does not desire to have the analysis process repeated on a selected region of the uploaded image 82, then, at step 220, the system user is queried as to whether another image file is to be uploaded. If another image file is to be uploaded, then the process proceeds to step 104 (FIG. 4). If another image file is not to be uploaded, the system user may proceed to step 214. Alternatively, of course, the system user may exit the eyewear web site.

If, at step 206, the system user indicates that the face images 86 and 94 are not the face images of interest to the user, then, at step 222, the face image having the next highest priority is processed and a second extracted face image 86 and modified face image 94 are downloaded. Alternatively, all of the remaining face images are processed and downloaded for the system user to select a desired face image. The amount of data downloaded may be minimized by downloading thumbnail representations of each of the remaining face images found in the uploaded image 82.

At step 224, the system user is queried as to whether a face image has been selected. If a face image has been selected, then the process proceeds to step 208 and continues as described above. If a face image has not been selected, then the process proceeds to step 216 and continues as described above.

If, at step 208, the system user determines that the face images 86 and 94 were not accurately reproduced, then, at step 226, the user is provided information regarding various techniques that may be used to upload higher quality face image files and, thereafter, proceeds to step 228. If, at step 228, the system user decides to use the inaccurately reproduced images, then the process proceeds to step 210 and continues as described above. If, at step 228, the system user decides instead that he will not use the inaccurately reproduced images, then the process proceeds to step 220 and continues as describes above.

Figure 8:
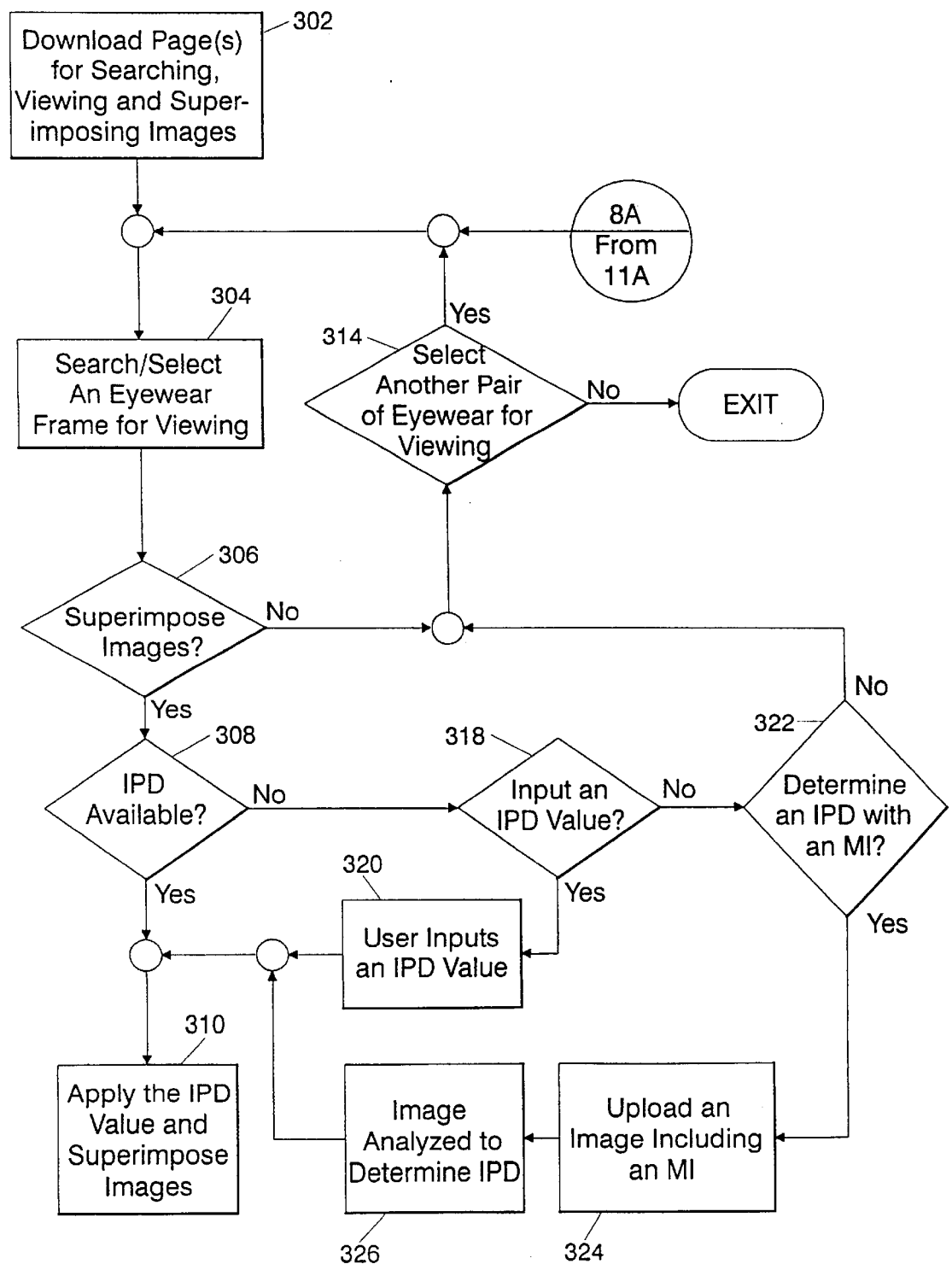
FIG. 8 is a flow chart depicting a process wherein a system user selects an eyewear frame and a face image for superimposition.

Referring to FIG. 8, a flow chart illustrates the steps of subroutines 46 and 48, wherein a system user selects an eyewear frame and has it superimposed onto a face image. At step 302, a system user receives searching page 32 which facilitates searching for desired eyewear frames. The searching page 32 permits the system user to input desired eyewear frame characteristics such as brand name, color, size, shape, etc.

At step 304, the system user enters search terms identifying her personal preferences and transmits them to the server 12. The eyewear description files 52 are searched and a list of eyewear frames that satisfy the search terms are returned to the system user. The system user selects an eyewear frame ("review frame image") from the list for review. The review frame image is downloaded from the eyewear image files 54 and displayed to the system user on the eyewear reviewing page 34.

The review frame image is far more detailed than the generic frame image 92 utilized to evaluate the accuracy of an extracted face image 86. More particularly, the review frame image is displayed as a three-dimensional representation of the eyewear frame of interest, including all of the detailed characteristics of the actual eyewear frame that it represents, e.g., style, color, and lens tint.

At step 306, the system user is queried as to whether the eyewear frame shown in the review frame image is to be superimposed onto the active face image. The eyewear/face-image superimposition page 36 may be accessed for performing this function.

The image that will be superimposed onto the active face image is a frontal view of the eyewear frame of interest to the user. This image is termed the "selected frame image". In an embodiment of the present invention, the selected frame image is the same image as the review frame image. That is, it is foreseen that three-dimensional representations of the eyewear frame of interest may be utilized for superimposition on faces that are angularly positioned in an active face image.

A selected frame image of an eyewear frame of interest may be generated by taking a digital photograph of an eyewear frame and saving it as a bit-map file. The background, temples, and, for frames including non-tinted lenses, the lenses are made transparent. Such image editing may be performed using the image-editing program 64. An image-editing program that may be integrated into the present invention for performing the above-described image editing function is Adobe Photoshop® 5 (Adobe Systems Inc., San Jose, Calif.).

If, at step 306, the system user indicates that the eyewear frame of interest is to be superimposed, then, at step 308, the system user is prompted to enter an IPD. If the IPD was previously entered by the system user, and, therefore, it is stored in the user information files 56, then the system user is not prompted to enter the IPD value. The system user may change a previously entered IPD at any time by utilizing the user information page 38.

If, at step 308, it is determined that the IPD was previously entered, then, at step 310, the IPD is applied to the selected frame image. Thereafter, the selected frame image is superimposed onto the active face image. The result is a superimposed image in which the selected frame image is accurately scaled to the active face image.

FIGS. 9(a)–9(f) illustrate the process by which the images of two selected eyewear frames which are alike except for their width are scaled before being superimposed onto an active face image. As described above with reference to FIGS. 6(a) and 6(b), the woman's face in image 84 has an IPD of 52 mm (FIG. 6(a)). In addition, extracted face image 86 has tying points 88 and 90, which are positioned so that the pupils are displayed at approximately 20 mm apart (FIG. 6(b)). Therefore, the relationship between the display image and the full-scale image is defined by the ratio 20 mm:52 mm. That is to say, the display image is approximately 38.5% of the full-scale image.

Figure 9A:
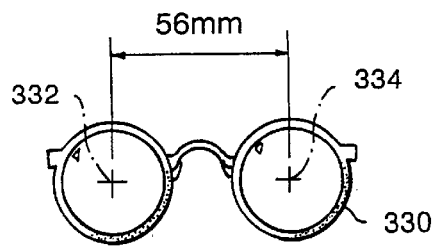
FIGS. 9(a)–9(f) illustrate a process by which a selected frame image is scaled before being superimposed onto an active face image.
Figure 9D:
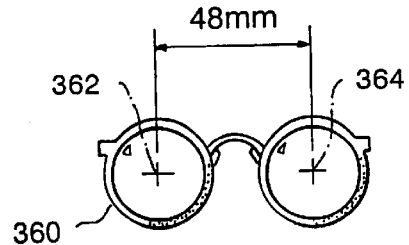

FIG. 9(a) illustrates an image of an eyewear frame 330 having a particular style. The full-scale distance between the center of each lens, points 332 and 334, is 56 mm. FIG. 9(d) illustrates image of an eyewear frame 360 having the same style as that of eyewear frame image 330, however, the full-scale distance between the center of each lens, points 362 and 364, is 48 mm.

For the present example, the extracted face image 86 is the active face image. That is, the extracted face image 86 was either just created, and, therefore, is the active face image by default, or it was selected by the system user to be the active face image.

Figure 9B:
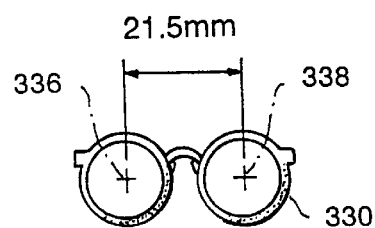
Figure 9E:
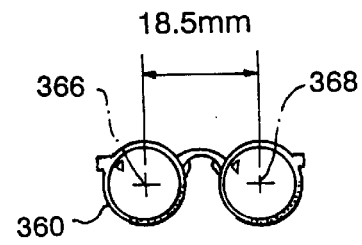
Figure 9C:
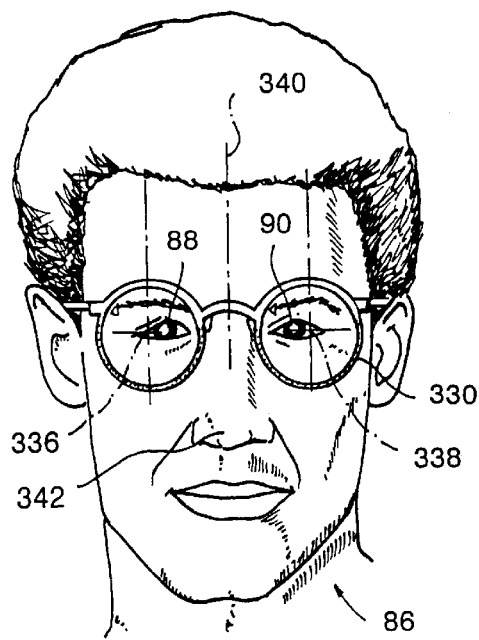

If eyewear frame image 330 (FIG. 9(a)) is selected by a system user to be superimposed onto the active face image 86, the system will initially scale eyewear frame image 330 by 38.5%. After scaling, as illustrated in FIG. 9(b), the distance between the center of each lens, points 336 and 338, is 21.5 mm (56 mm×0.385). Thereafter, as illustrated in FIG. 9(c), eyewear frame image 330 is superimposed onto the active face image 86.

Scaled eyewear frame image 330 may be positioned on active face image 86 so that a line connecting points 336 and 338 is coincident with a line connecting the center of each pupil, points 88 and 90, in the active face image 86. Furthermore, scaled eyewear frame image 330 may be centered about line 340, which extends through the center of nose 342 in the active face image 86.

If eyewear frame image 360 (FIG. 9(d)) is selected by a system user to be superimposed onto the active face image 86, the system will initially scale eyewear frame image 360 by 38.5%. After scaling, as illustrated in FIG. 9(e), the distance between the center of each lens, points 366 and 368, is 18.5 mm (48 mm×0.385). Thereafter, as illustrated in FIG. 9(f), eyewear frame image 360 is superimposed onto the active face image 86.

Scaled eyewear frame image 360 may be positioned on active face image 86 so that a line connecting points 366 and 368 is coincident with the line connecting the center of each pupil, points 88 and 90, in the active face image 86. Furthermore, scaled eyewear frame image 360 may be centered about line 340.

Those skilled in the art will appreciate that various weighting factors may be applied to the scaling ratio to adjust the scale of the eyewear frame images to the scale of the active face image. Such weighting factors may be applied to compensate for the effects of image distortions, color variations, attitude of an eyewear frame image with respect with the active face image, etc.

Figure 9F:
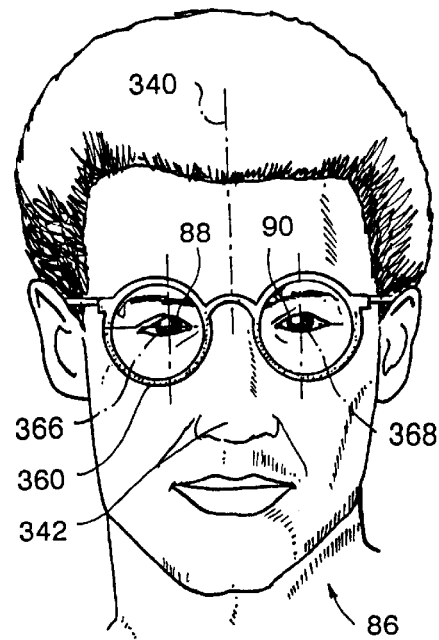

After viewing the two superimposed images i.e., FIGS. 9(c) and 9(f), the system user makes a comparison to determine which eyewear frame image, 330 or 360, satisfy his tastes. The system user would likely choose eyewear frame image 360 as its more narrow configuration fits her face better.

The selected frames can be even more accurately positioned onto the active face image 86 by considering the left and right MPD of the woman's face. The left and right MPDs can be readily calculated after the IPD is input into the server 12.

Figure 10A:
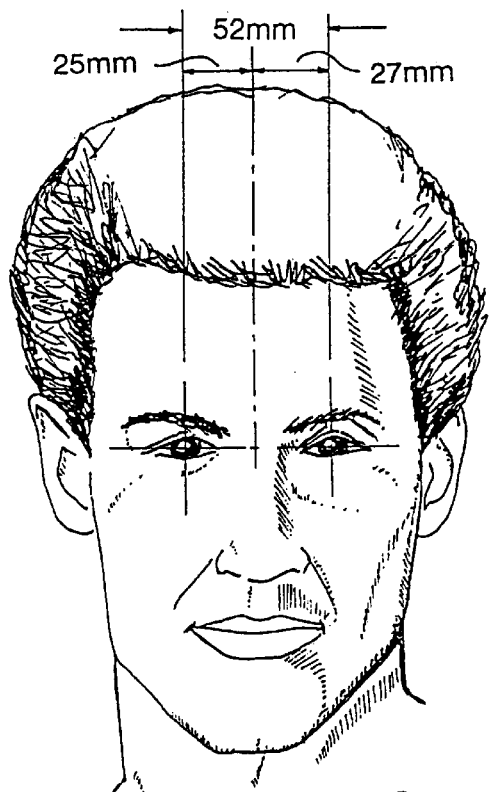
FIGS. 10(a)–10(d) illustrate a process by which a selected frame image is shifted before being superimposed onto a face image.
Figure 10C:
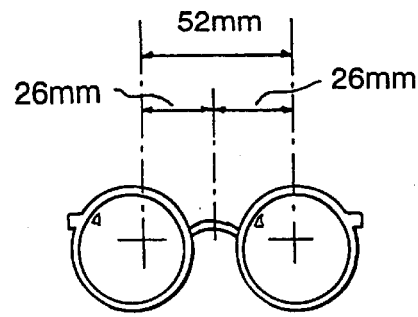
Figure 10B:
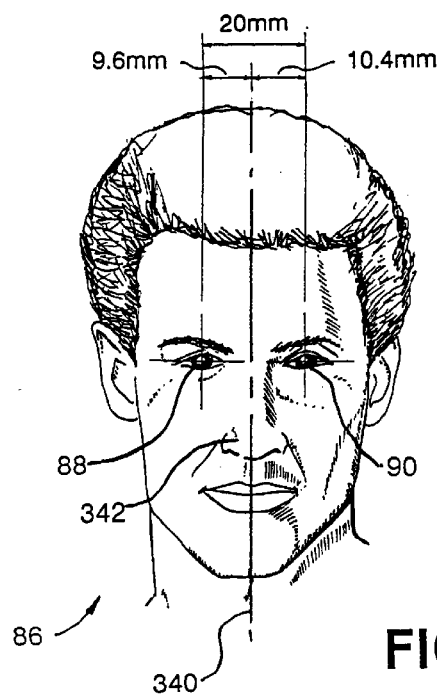
Figure 10D:
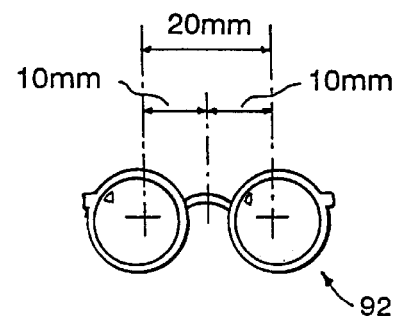

Referring to FIGS. 10(a)–10(d), for example, if the left and right MPD of the woman's face is equal to 27 mm and 25 mm, respectively (FIG. 10(a)), then the distances between point 90 and centerline 340, and point 88 and centerline 340 are equal to 10.4 mm and 9.6 mm, respectively (27 mm×0.385 and 25 mm×0.385, respectively) (FIG. 10(b)). The system 12 is capable of determining this based on the IPD and the relative positions of the facial features as located by the image analysis program 60.

If the selected frame image is to be superimposed onto the active face image 86 based only on the tying points 88 and 90, it would appear to interfere with nose 342 in the active face image 86. This would provide an inaccurate representation of the eyewear frame fitted in the woman's face.

To correct for this effect, the selected frame image may be shifted 0.4 mm ((10.4−9.6)/2) in the horizontal direction toward the right eye so that the selected frame image appears to be sitting properly on nose 342 of the active face image 86.

If, at step 306, the system user does not desire to have the selected frame image superimposed onto the active face image, then, at step 314, she is queried as to whether she desires to select another eyewear frame for viewing. If the system user desires to select another eyewear frame for viewing, then the process proceeds to step 304 and continues as described above. If the system user does not desire to select another eyewear frame for viewing, then she may exit the subroutine.

If, at step 308, the IPD is not available in the user information files 56, then, at step 318, the system user is queried to input an IPD. If, at step 318, the system user knows the IPD, he then inputs the IPD into the user information files 56 at step 320. Thereafter, the process proceeds to step 310 and continues as described above.

Those skilled in the art will appreciate that there are various conventional methods by which IPD may be measured. For example, IPD may be measured with a straight rule, a Rodenstock Interpupillary Gauge, and an IPD measuring instrument such as the Essilor Pupilometer (Essilor of America, St. Petersburg, Fla.) or the Topcon PD-5, PD Meter (Topcon America Corp., Paramus, N.J.). These and other conventional methods for measuring IPD are discussed by Clifford W. Brooks and Irvin M. Borish, "A System for Ophthalmic Dispensing", Ch. 3, pgs. 23–31 (Butterworth-Heinemann Publishers, 2d ed., 1996), the contents of which are incorporated by reference herein.

If, at step 318, the system user does not have the IPD, the system user is queried at step 322 as to whether he desires to utilize a measurement icon ("MI") to determine the IPD. If, at step 322, the system user does not desire to utilize an MI to determine the IPD, then the process proceeds to step 314 and continues as discussed above. If instead the system user desires to utilize an MI to determine the IPD, the process proceeds to step 324.

At step 324, the system user uploads a face image in a manner similar to that described above at steps 104 (FIG. 4). The image, however, includes an MI positioned, for example, between the eyebrows on the system user's face.

At step 326, the image is analyzed to determine the IPD. More particularly, the known dimension of the MI is multiplied by a ratio of the length of the MI's reference surface with respect to the length of a line connecting the left and right pupils. The length of the MI's reference surface and the length of the line connecting the left and right pupils is determined using the image analysis program 60.

For example, if the diameter of the MI is exactly 20 mm, and the image analysis program 60 determines that the ratio of the length of the MI's reference surface and the length of a line connecting the left and right pupils is 2.5:1, then the IPD is exactly 50 mm (20 mm×(2.5/1)). After the IPD is determined, the process proceeds to step 310 and continues as described above.

Those skilled in the art will appreciate that various weighting factors may be applied to the ratio of the length of the MI's reference surface and the length of a line connecting the left and right pupils. Such weighting factors may be applied to compensate for the effects of image distortions, color variations, attitude of the eyewear frame image with respect with the active face image, etc.

Figure 11:
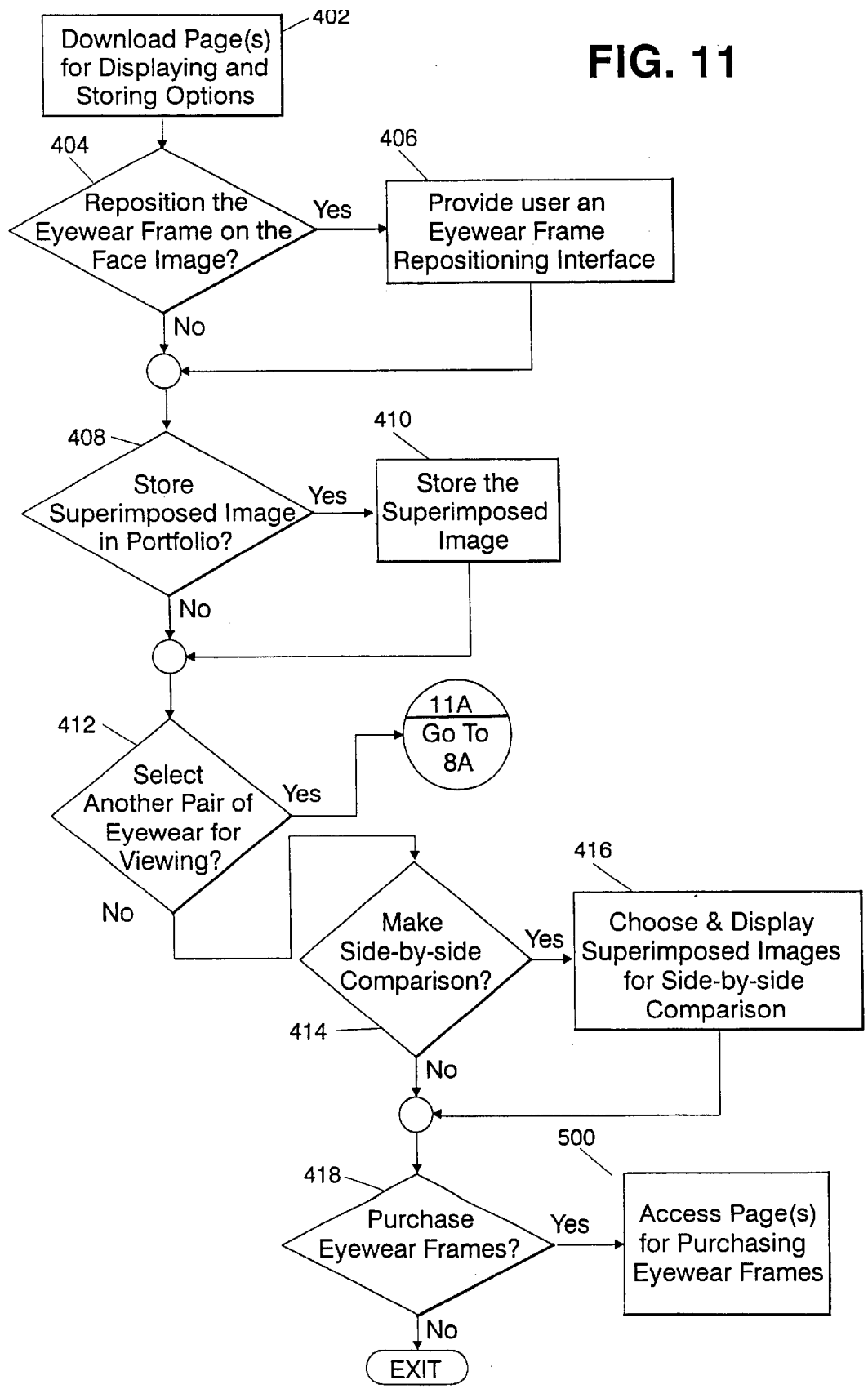
FIG. 11 is a flow chart depicting a process wherein a system user may alter a display of a superimposed image and store the same.

Referring to FIG. 11, a flow chart illustrates the steps of subroutines 47 and 50, wherein a system user may alter a display of a superimposed face image, store the image, and purchase a selected eyewear frame. At step 402, the system user downloads the image management page 39. At step 404, with a superimposed image available on the display, the system user is queried as to whether she desires to reposition the eyewear frames on the image.

If, at step 404, the system user indicates a desire to reposition the eyewear frames, then, at step 406, arrow-based controls are made available to the system user so the selected eyewear frames may be relocated on the face image. Thereafter, the process proceeds to step 408. If, at step 404, the system user does not desire to reposition the eyewear frames, then she proceeds directly to step 408.

At step 408, the system user is queried as to whether she desires to store the superimposed image in the user face-image files 58. If, at step 408, the system user indicates a desire to store the superimposed image, then, at step 410, the superimposed image is stored. Thereafter, the process proceeds to step 412. If, at step 408, the system user does not desire to store the superimposed image, then she proceeds directly to step 412.

At step 412, the system user is queried as to whether she desires to select another eyewear frame for viewing. If, at step 412, the system user indicates a desire to select another eyewear frame for viewing, then the system user proceeds to step 304 (FIG. 8) and continues as described above. If, at step 412, the system user does not desire to select another eyewear frame for viewing, then she proceeds directly to step 414.

At step 414, the system user is queried as to whether she desires to make a side-by-side comparison of superimposed images that she has stored in user face-image files 58. If, at step 414, the system user indicates a desire to make a side-by-side comparison, then, at step 416, she chooses superimposed images of interest from user face-image files 58 and displays the images. Thereafter, the system user proceeds to step 418. If, at step 414, the system user does not desire to make a side-by-side comparison, then she proceeds directly to step 418.

At step 418, the system user is queried as to whether she desires to purchase eyewear frames. If, at step 418, the system user indicates a desire to purchase eyewear frames, then, at step 500, she accesses the eyewear order-form page 40, which provides access to electronic order forms and the like for purchasing eyewear frames. If, at step 418, the system user does not desire to purchase eyewear frames, then the system user exits the eyewear web site.

Those skilled in the art will appreciate that even though the processes herein are described in serial fashion, such is done for the purpose of elucidating the preferred embodiments of the invention and in no way is intended to limit the scope of the claims. That is, many of the process steps described above may be carried out in reverse order and/or simultaneously. For example, although steps 404, 408, 412, 414 and 418 are depicted and described in serial fashion, a web page may, and often does, display simultaneously icons for initiating each function.

It is clear from the foregoing that the present system and method for automating the process of remotely trying on eyewear frames via a computerized system provides an advancement in the art of fitting eyewear. The inventive system eliminates the need for a system user to position a face image so it will properly align with an eyewear frame. In addition, the inventive system does not require a system user to input the IPD or MPD in order to scale and position an image of an eyewear frame on a face image. Furthermore, the inventive system enables the system user to quickly evaluate the quality of an uploaded image through the use of a generic frame image.

While the invention has been described with respect to a specific embodiment, in particular, for superimposing a selected frame image on an active face image, those skilled in the art will readily appreciate that various modifications, changes and enhancements may be made thereto without departing from the spirit and scope of the invention as defined by the appended claims. For example, the invention may be utilized for accurately displaying images of jewelry. wigs, etc. that are superimposed on a face image. In addition the invention may be utilized for accurately displaying images of jackets, sweaters, pants, etc., that are superimposed on an image of a person.

In general, the present invention may be used for accurately displaying an image of any object that has been superimposed onto the image of another object. Therefore, the present invention may be used in such diverse fields as home decorating and landscaping. For purposes of this wide array of applications, the term "accessory image" shall refer to an image of an object that is to be superimposed onto an image of another object.

It is to be understood, therefore, that the forms of the invention described in detail are to be taken as particular embodiments thereof and that various changes and modification may be resorted to without departing from the spirit and scope of the invention as defined by the appended claims.

What is claimed is:

1. A method for determining interpupillary distance comprising:
   receiving data indicative of a face image in a computer, said face image having a first pupil and a second pupil;
   receiving data indicative of the full-scale dimension between the first pupil and the second pupil, wherein said data is indicative of a measurement icon having a known dimension and a reference surface of known length;
   determining a length for a line from the first pupil to the second pupil; and
   multiplying the known dimension of the measurement icon by a ratio of the length of the measurement icon's reference surface with respect to the length of the line connecting the left and right pupils, thereby determining interpupillary distance.

2. The method of claim 1, wherein a weighing factor is applied to at least one of the ratio of the length of the measurement icon's reference surface or the length of the line connecting the left end right pupils.

3. The method of claim 1, wherein the interpupillary distance is used to scale the face image.

4. The method of claim 3, wherein the scaled face image is displayed.

5. The method of claim 3, wherein an accessory image is superimposed upon the scaled face image.

6. The method of claim 5, wherein the superimposed image is displayed.

7. The method of claim 5, wherein the accessory image is an eyewear frame.

8. The method of claim 3, wherein the image is stored in a storage device of a computer.

9. The method of claim 4, wherein the image is stored in a storage device of a computer.

10. The method of claim 5, wherein the image is stored in a storage device of a computer.

11. The method of claim 6, wherein the image is stored in a storage device of a computer.

12. The method of claim 5, wherein the accessory image is repositioned on the scaled face image.

13. A computer system for determining interpupillary distance in a face image comprising:

a memory device for storing a program;

a processor in communication with said memory;

said processor being operative with said program to receive data indicative of a face image having a first pupil and a second pupil;

said processor being operative with said program to receive data indicative of a full scale dimension between the first pupil and the second pupil, wherein said data is indicative of a measurement icon having a known dimension and a reference surface of known length;

determining a length for a line from the first pupil to the second pupil; and multiplying the known dimension of the measurement icon by a ratio of the length of the measurement icon's reference surface with respect to the length of the line connecting the left and right pupils, thereby determining interpupillary distance.

14. The system of claim 13, wherein a weighting factor is applied to at least one of the ratio of the length of the measurement icon's reference surface or the length of the line connecting the left and right pupils.

15. The system of claim 13 wherein the interpupillary distance is used to scale the face image.

16. The system of claim 15 wherein the scaled face image is displayed.

17. The system of claim 15 wherein an accessory image is superimposed upon the scale face image.

18. The system of claim 17 wherein the superimposed image is displayed.

19. The system of claim 17 wherein the accessory image is an eyewear frame.

20. An article of manufacture comprising:

a computer readable medium comprising instructions for;

receiving data indicative of a face image having a first pupil and a second pupil;

receiving data indicative of a full-scale dimension between the first pupil and the second pupil, wherein said data is indicative of a measurement icon having a known dimension and a reference surface of known length;

determining a length for a line from the first pupil to the second pupil; and multiplying the known dimension of the measurement icon by a ratio or the length of the measurement icon's reference surface with respect to the length of the line connecting the left and right pupils.

21. A method for accurately displaying superimposed images, comprising:

downloading a base image having a first feature and a second feature into a computer;

receiving data indicative of a full-scale dimension between the first feature and the second feature;

scaling the base image to have a predefined dimension between the first feature and the second feature when displayed;

scaling on accessory image based upon at least a ratio between the predefined dimension and the full-scale dimension;

superimposing the scaled accessory image onto the scaled base image;

locating the first feature and the second feature utilizing an image analysis program;

locating a third feature of the base image utilizing the image analysis program;

automatically aligning the scaled accessory image with the third feature in the base image;

determining a first offset dimension between the first feature and the third feature and a second offset dimension between the second feature and the third feature; and shifting the accessory image toward the lesser of the first offset dimension and second offset dimension by approximately one-half the difference between the first offset dimension and the second offset dimension; and scaling the accessory image based upon a ratio between about 0.3 and 0.45.

22. The method as recited in claim 21, wherein the base image is an image of a face.

23. The method as recited in claim 21, wherein the data indicative of the full-scale dimension comprises an image of the face and a measurement icon.

24. The method as recited in claim 21, wherein the data indicative of the full-scale dimension is selected from at least one of an interpupillary distance, a left monocular pupillary distance, and a right monocular pupillary distance.

25. The method as recited in claim 21, wherein the data indicative of the full-scale dimension includes an image of the face and a measurement icon.

26. A method for accurately displaying superimposed images, comprising:

downloading an image into a storage device of a computer;

extracting a base image from the downloaded;

scaling the base image to have a predefined dimension between a first feature and a second feature when displayed, wherein the first feature and the second feature are located utilizing an image analysis program;

receiving data indicative of a full-scale dimension between the first feature and the second feature;

generating a modified image, which comprises the base image and an accessory image, by scaling the accessory image based upon at least a ratio between the predefined dimension and the full-scale dimension;

transmitting the base image and the modified base image to a user for evaluation; or transmitting the downloaded image in image-map form to the user;

receiving input from the user identifying region in the downloaded image requiring further analysis; and analyzing the region to determine the presence of the base image.

27. The method as recited in claim 26, wherein analyzing the region to determine the presence of the base image comprises utilizing an image analysis program to locate a first feature and a second feature of the base image.

* * * * *